UNITED STATES PATENT OFFICE.

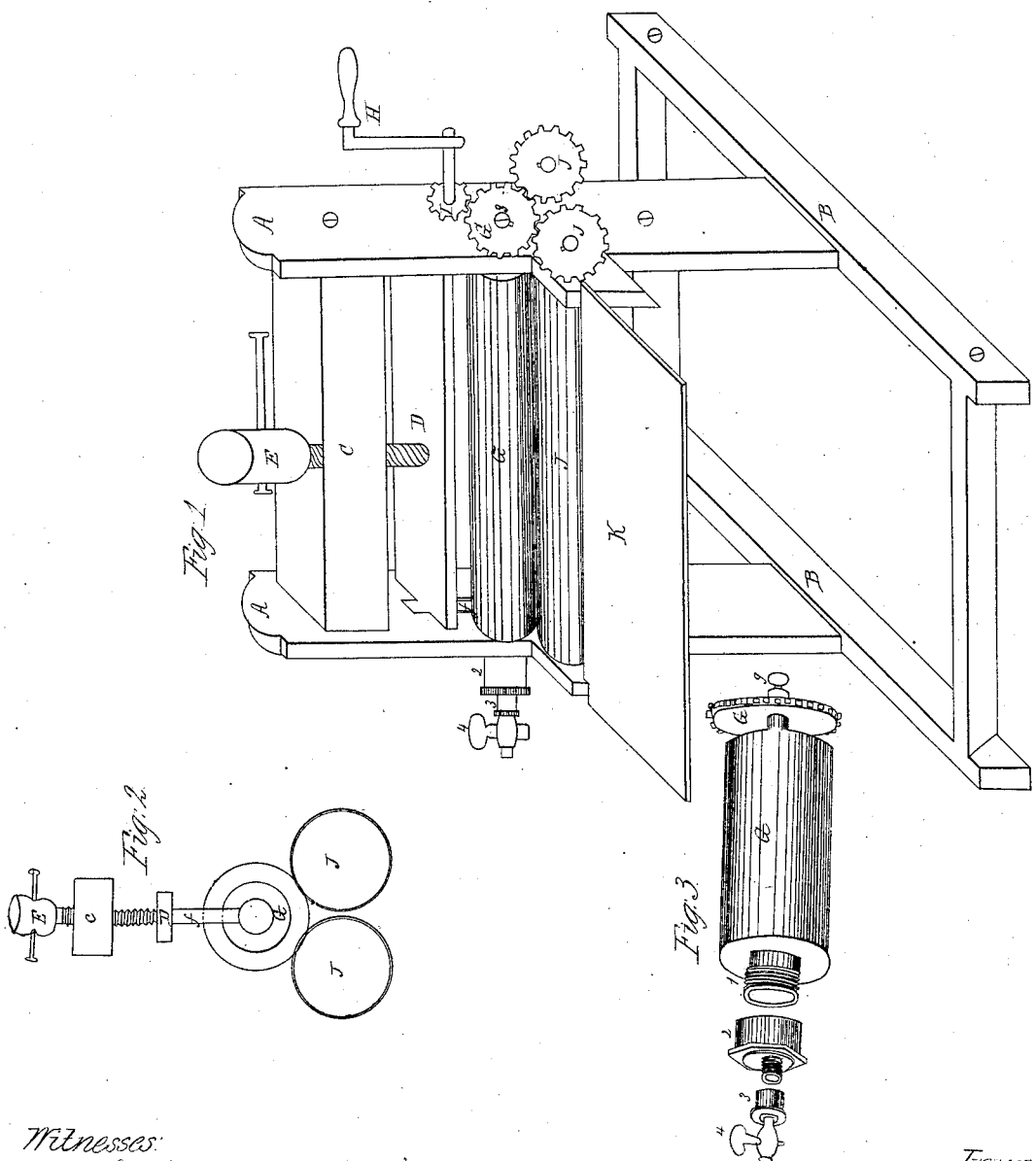

JOHN SHAEFER, OF LANCASTER, PENNSYLVANIA.

MACHINE FOR IRONING CLOTHES.

Specification of Letters Patent No. 21,450, dated September 7, 1858.

*To all whom it may concern:*

Be it known that I, JOHN SHAEFER, of Lancaster, in the county of Lancaster and State of Pennsylvania, have invented a new and useful Machine for Ironing or Smoothing Starched or Unstarched Clothing, Linen, &c., After Being Washed, called the "Heated Cylindric Mangling-Machine;" and I do hereby declare that the following is a full, clear, and exact description of the construction and operation of the same, reference being had to the annexed drawings, making a part of this specification, in which—

Figure 1 is a perspective view; Fig. 2, a transverse section; Fig. 3, the cylinder and its parts.

On a base frame B, are erected two uprights A, of any desired dimensions and distance apart, a cross piece C, with the thread for a screw E in its center. This cross piece is firmly framed to the uprights A. The screw E operates on a movable cross piece D, the ends of which have a piece *f*, attached at right angles in a groove in the uprights A, and resting upon the axis of the cylinder G, and thus enables the operator to adapt the pressure to the thickness of the goods to be passed through or under it and over the rollers J, J. The hollow cylinder G is made out of good boiler or cast iron and turned off smooth and true. On the one end there is an opening neck with a screw cut thereon (1) of sufficient diameter to admit of introducing a round red hot iron, heated gravel stones, boiling-water, alcohol, or any means for giving a permanent heat to the same while using. A cap 2, with a thread cut therein fits over said opening 1, having also a smaller neck with a screw cut thereon, to which may be adjusted a steam pipe for heating said cylinder. To the screw neck 2, a cap 3 with a spigot 4 is also affixed for drawing off the water or condensed steam, &c. There is also a neck or opening at the opposite side of said cylinder, in its axis and supports the cog-wheel G, through the center of which this neck projects, closed by a screw plug *g*, by which draft can be given to the cylinder when using inflamed spirits or burning coal. Said cylinder G rests or nearly so, as desired, on two rollers J, J, of equal length and dimension made out of well seasoned wood or turned cast iron, to the axis of each of which and the cylinder is attached a cog-wheel gearing into each other, and made to revolve the cylinder and rollers by the handled small wheel H, I, on a shaft outside and across the machine on the side of the movable cross-piece D.

To each side of the machine there is a table K, on which the goods are placed or retained when passing between the rollers.

The operation of the machine has been practically demonstrated with various materials for heating, as the bed of the revolving cylinder will hold several gallons of heated water, gravel, or inflamed spirits, the flame of the latter heating the top of the cylinder in its revolutions, while a round bar of heated iron or gravel stones which are found to retain and impart a sufficiency of heat to give to starched or unstarched sheets, pillow cases, curtains, quilts and the like a smooth clear dressing equal to the common tedious method with the smoothing iron and at a saving of great labor and time.

What I claim as my invention, and desire to secure by Letters Patent is—

The combination and arrangement of the hollow cylinder G, with the rollers J, J, the screws and caps 1, 2 and 3 the spigot 4, the screw plug *g*, the screw E, the tables K, all secured in the frame A and B, and operated by the crank and gear wheels substantially as and for the purposes specified.

JOHN SHAEFER.

Witnesses at signing:
WILLIAM FRICK,
JACOB HARNISH.